Figure 1:
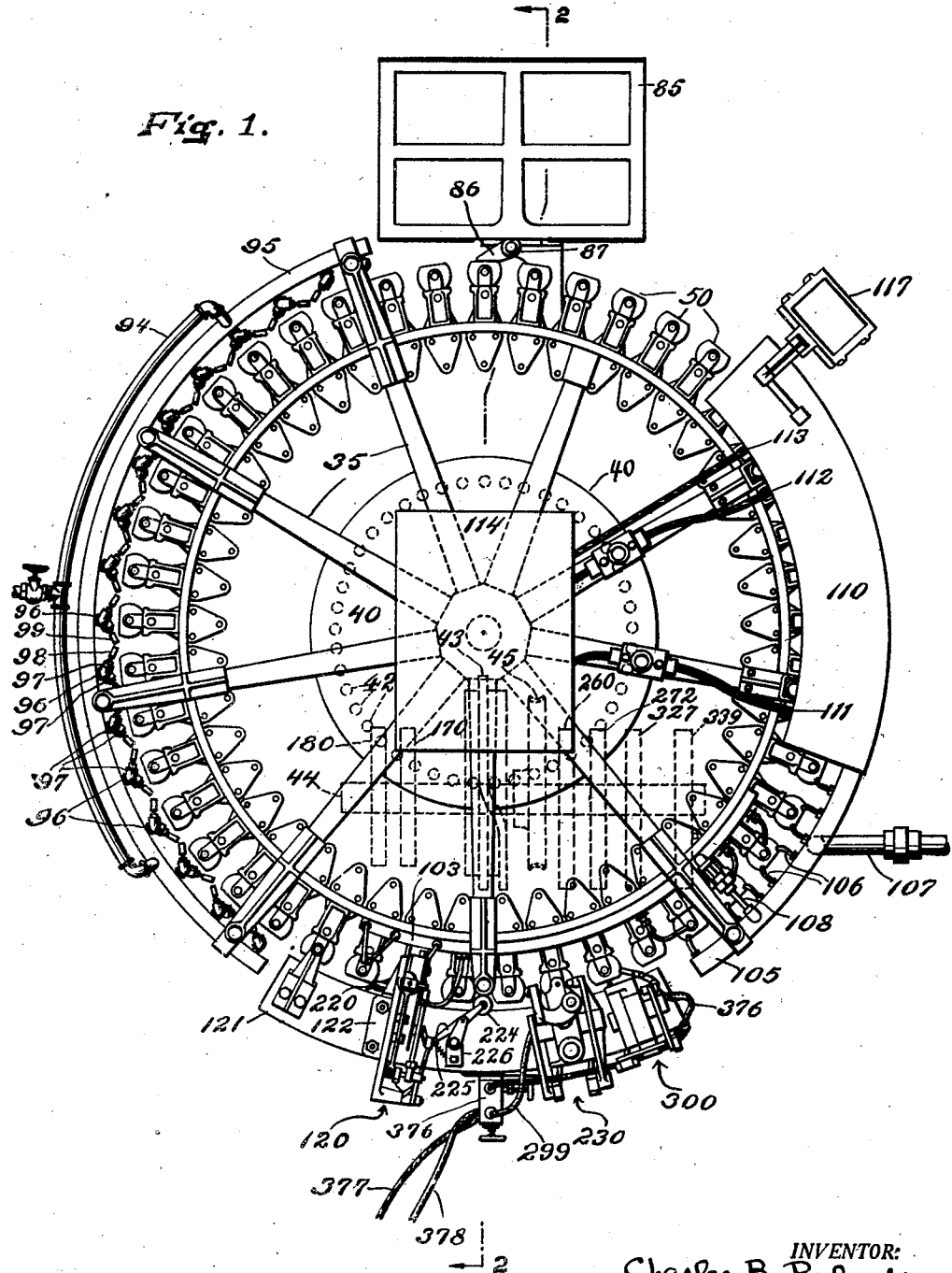

Feb. 2, 1937.  C. B. PALUCKI  2,069,386
LAMP MAKING MACHINE
Filed April 27, 1934  12 Sheets-Sheet 1

INVENTOR:
Charles B. Palucki
BY
Morrison, Kennedy & Campbell
ATTORNEYS.

Feb. 2, 1937.                C. B. PALUCKI                 2,069,386
                           LAMP MAKING MACHINE
                         Filed April 27, 1934        12 Sheets-Sheet 2

INVENTOR:
Charles B. Palucki
BY Morrison, Kennedy & Campbell
ATTORNEYS.

Feb. 2, 1937. C. B. PALUCKI 2,069,386
LAMP MAKING MACHINE
Filed April 27, 1934  12 Sheets-Sheet 3
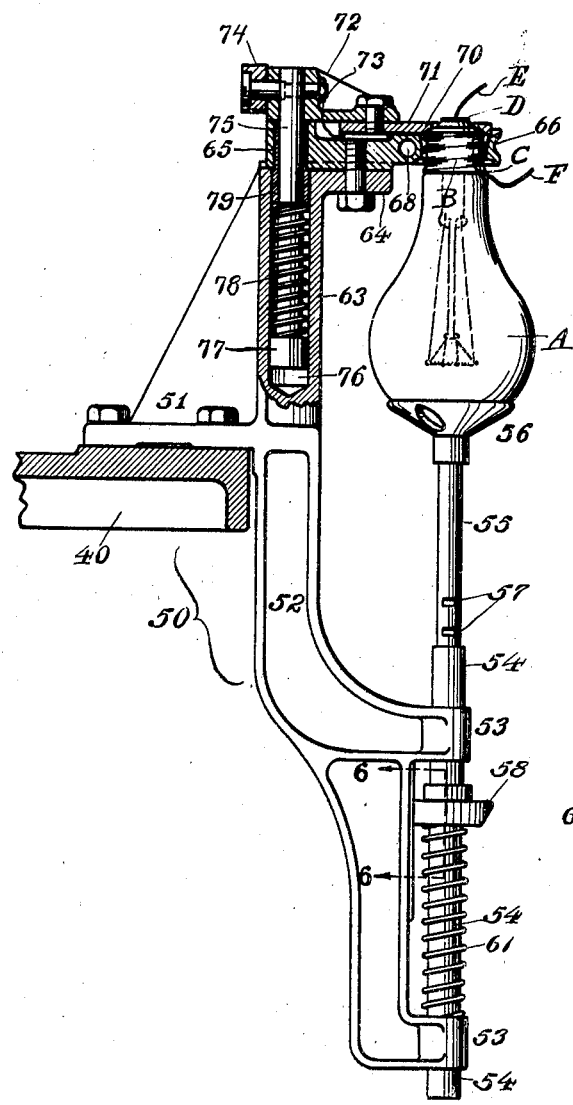
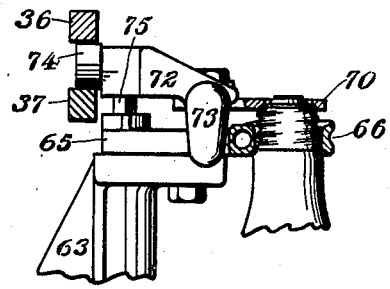
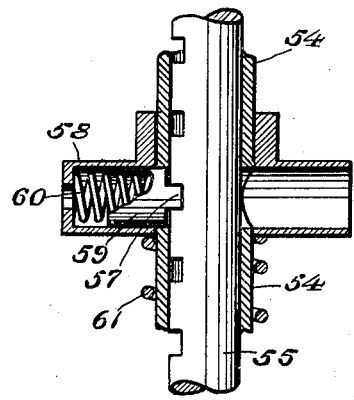
INVENTOR:
Charles B. Palucki
BY
Morrison, Kennedy & Campbell
ATTORNEYS.

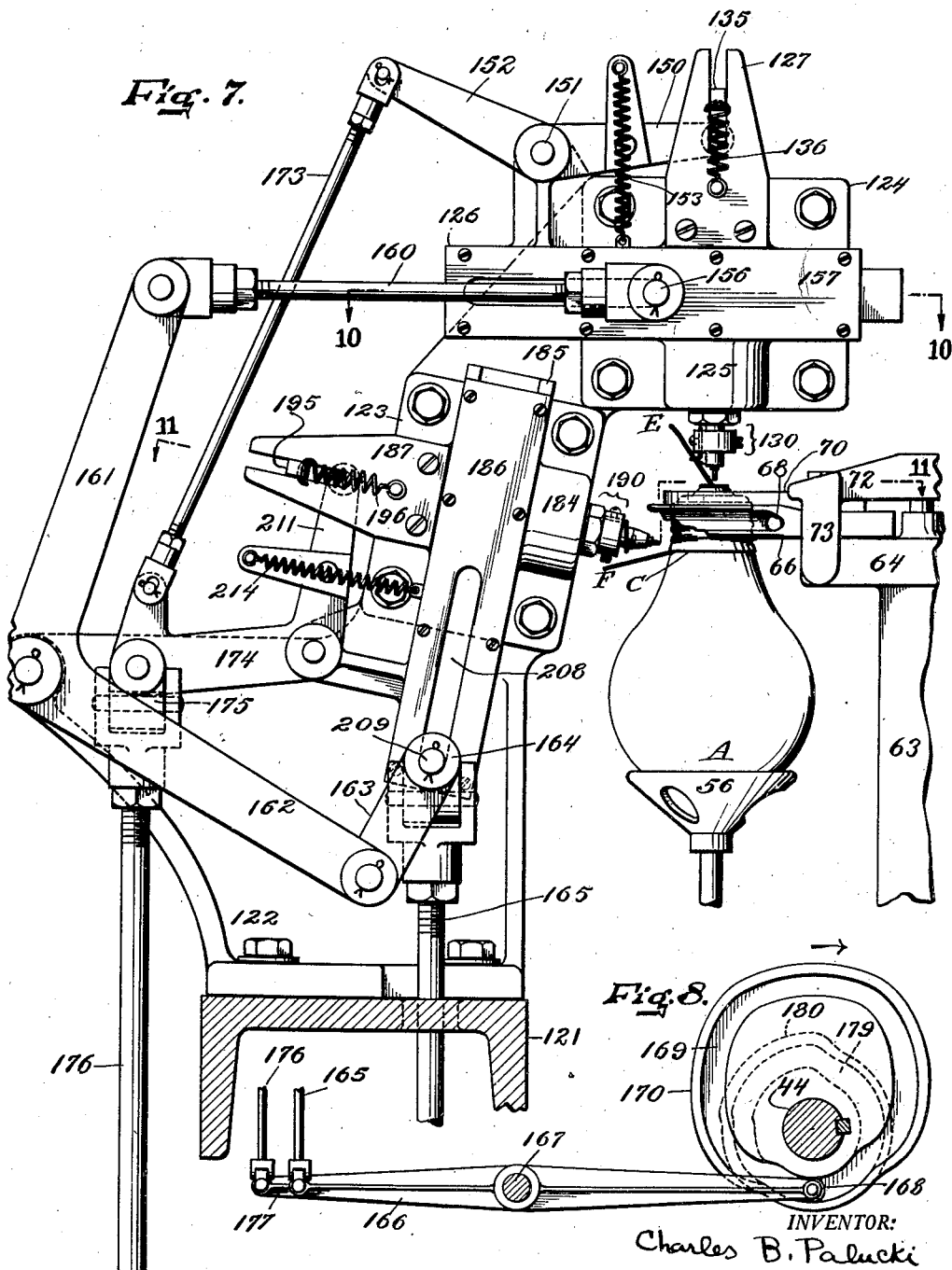

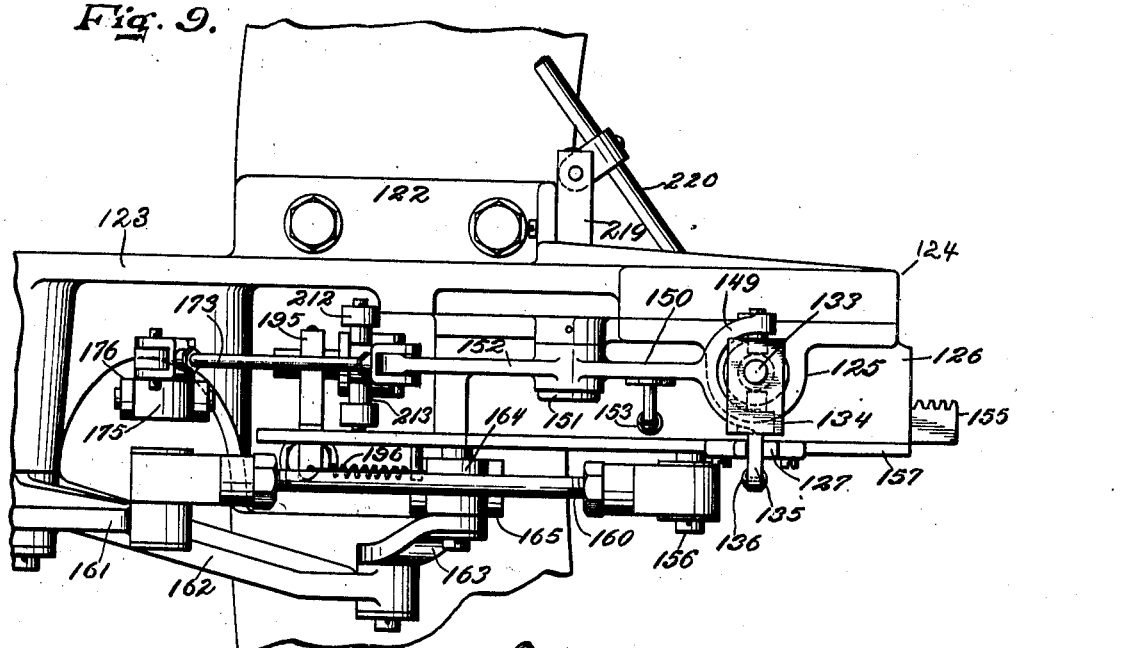

Feb. 2, 1937. C. B. PALUCKI 2,069,386
LAMP MAKING MACHINE
Filed April 27, 1934  12 Sheets-Sheet 6
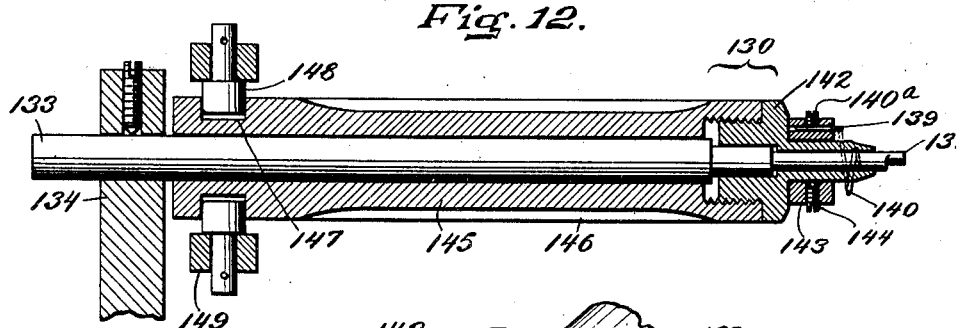
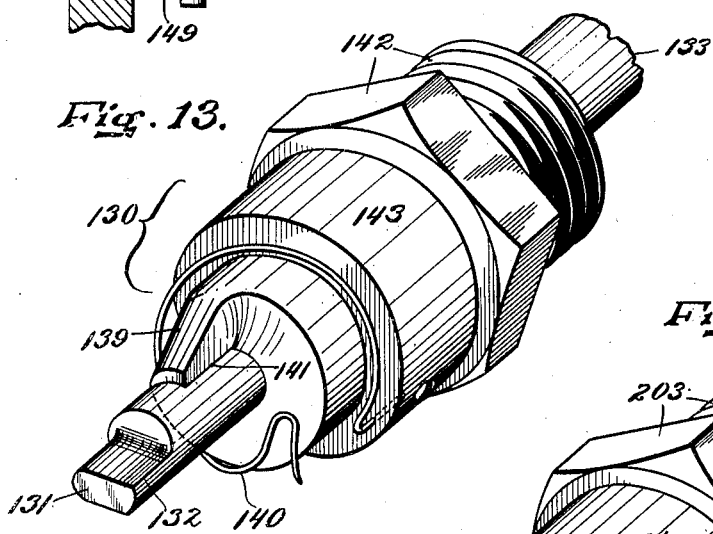
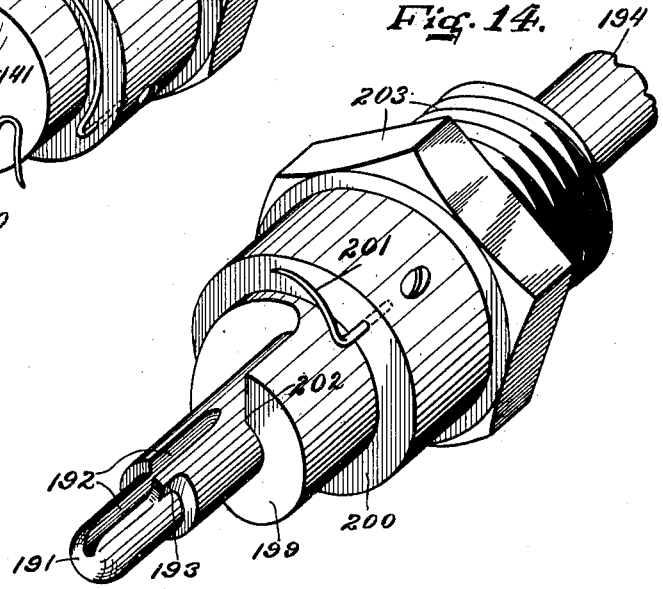
INVENTOR:
Charles B. Palucki
BY
Morrison, Kennedy & Campbell
ATTORNEYS.

Feb. 2, 1937. C. B. PALUCKI 2,069,386
LAMP MAKING MACHINE
Filed April 27, 1934 12 Sheets-Sheet 7

INVENTOR:
Charles B. Palucki
BY
Morrison, Kennedy & Campbell
ATTORNEYS.

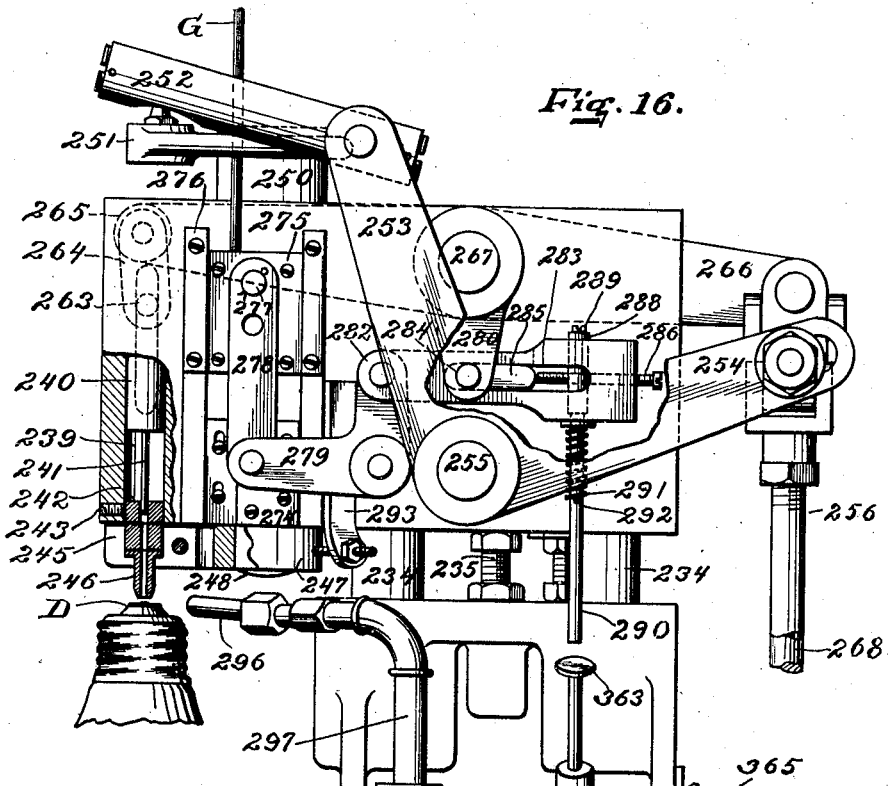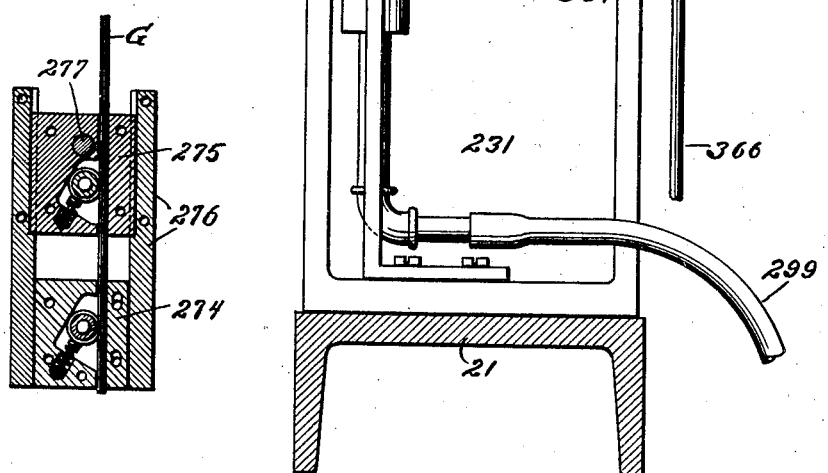

Feb. 2, 1937. C. B. PALUCKI 2,069,386
LAMP MAKING MACHINE
Filed April 27, 1934 12 Sheets-Sheet 9

INVENTOR:
Charles B. Palucki
BY Morrison, Kennedy & Campbell
ATTORNEYS.

Feb. 2, 1937.  C. B. PALUCKI  2,069,386
LAMP MAKING MACHINE
Filed April 27, 1934  12 Sheets-Sheet 11

INVENTOR:
Charles B. Palucki
BY Morrison, Kennedy & Campbell
ATTORNEYS.

Feb. 2, 1937.  C. B. PALUCKI  2,069,386
LAMP MAKING MACHINE
Filed April 27, 1934   12 Sheets-Sheet 12

INVENTOR:
Charles B. Palucki
BY
Morrison, Kennedy & Campbell
ATTORNEYS.

Patented Feb. 2, 1937

2,069,386

UNITED STATES PATENT OFFICE 2,069,386

LAMP MAKING MACHINE

Charles B. Palucki, Bergenfield, N. J., assignor to Alfred Hofmann & Company, West New York, N. J., a corporation of New Jersey Application April 27, 1934, Serial No. 722,627

11 Claims. (Cl. 176—3)

This invention is a novel lamp making machine, of the class known as a finishing machine, performing automatically one or more of the following sequence of operations in the manufacture of incandescent electric lamps, namely, (1) the basing operation consisting of attaching or cementing, by the aid of heat, of the base or end member of the lamp to the glass container or bulb member from which extend the embedded leadwires; (2) the bending of the leadwires into their intended positions and the severing of the excess lengths of wire; (3) the soldering of the respective leadwires to the respective metallic portions of the base; and (4) the flashing of the lamps and testing of them under observation. The invention is shown applied to that type of machine wherein is an endless or circular series of lamp-holding heads or chucks caused to travel a designated path or circuit, preferably intermittently, the successive operations being performed during travel or at particular stations, and the loosely assembled lamp members being loaded or infed to the heads and the completed lamps unloaded of delivered by suitable mechanism or manually.

The general objects of the invention are to afford a lamp making machine of the class stated, in which the successive steps or operations are performed with efficiency, and in which a large output or production is possible. A further object is to improve the operation of the machine, and of each step, by accuracy and reliability of action, so as to turn out a more uniformly perfect product. Another object pertains to convenience of operation and adjustment of the machine for various sizes or kinds of lamps. Other and further objects and advantages of the invention will be explained in the following description of an illustrative embodiment thereof or will be manifest to those conversant with the subject.

To the attainment of such objects and advantages the present invention consists in the novel lamp making machine and the novel features of method, operation, combination, mechanism and construction herein illustrated or described.

Figure 2:
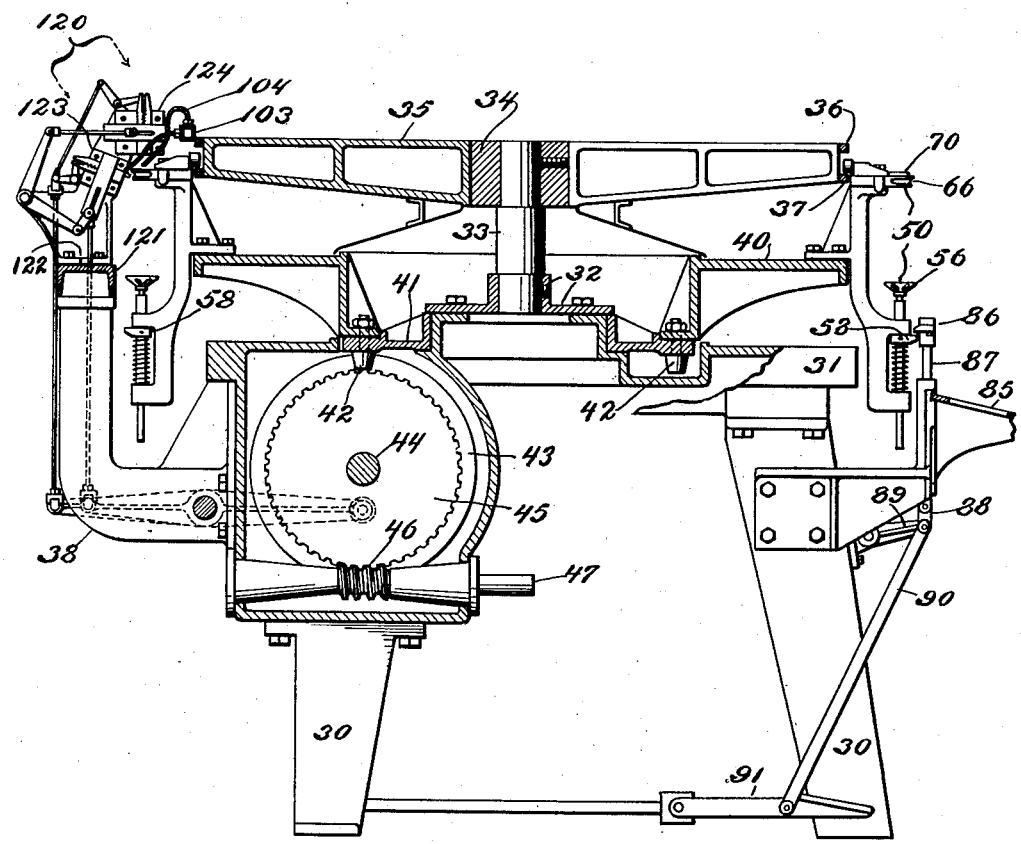
Figure 3:
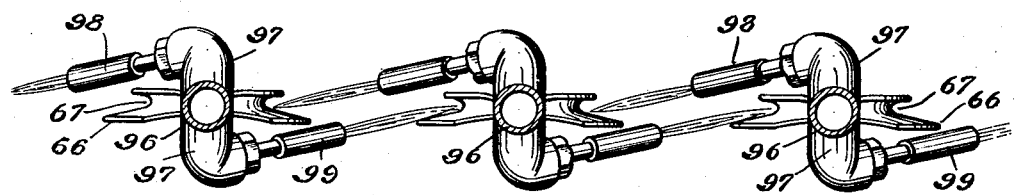

Figure 1 is a general top plan view of a basing machine embodying the present invention, the operative's position being at the far or upper side of the figure, where the loading and unloading occur. Fig. 2 is a vertical central section taken on the line 2—2 of Fig. 1. Fig. 3 is a diagrammatic side elevation showing the cooperative relation between the heating jets or flames and the flame shield members or rings.

Fig. 4 is a left elevation partly in section of one of the lamp carrying heads or chucks with its parts in the position occupied during cooling, bending, severing, soldering and flashing. Fig. 5 is a view like part of Fig. 4, but with the parts in position to hold the inverted lamp relatively slightly higher, being the adjustment occupied during heating. Fig. 6 is a vertical section on the line 6—6 of Fig. 4, on an enlarged scale, showing the means of chuck adjustment for lamps of different height or length.

Fig. 7 is a right elevation of the mechanism for bending and severing both the end and side leadwires respectively. Fig. 8 on a smaller scale is a right elevation of part of the actuating connections for the mechanism shown in Fig. 7. Fig. 9 is a top plan view of the bending and severing mechanism. Fig. 10 is a horizontal section taken on the line 10—10 of Fig. 7. Fig. 11 is a section partly inclined and partly horizontal taken on the broken line 11—11 of Fig. 7. Fig. 12 is a central section of the end wire bending and severing instrument. Fig. 13 is a perspective view of the same. Fig. 14 is a perspective view of the side wire bending and severing instrument.

Figure 15:
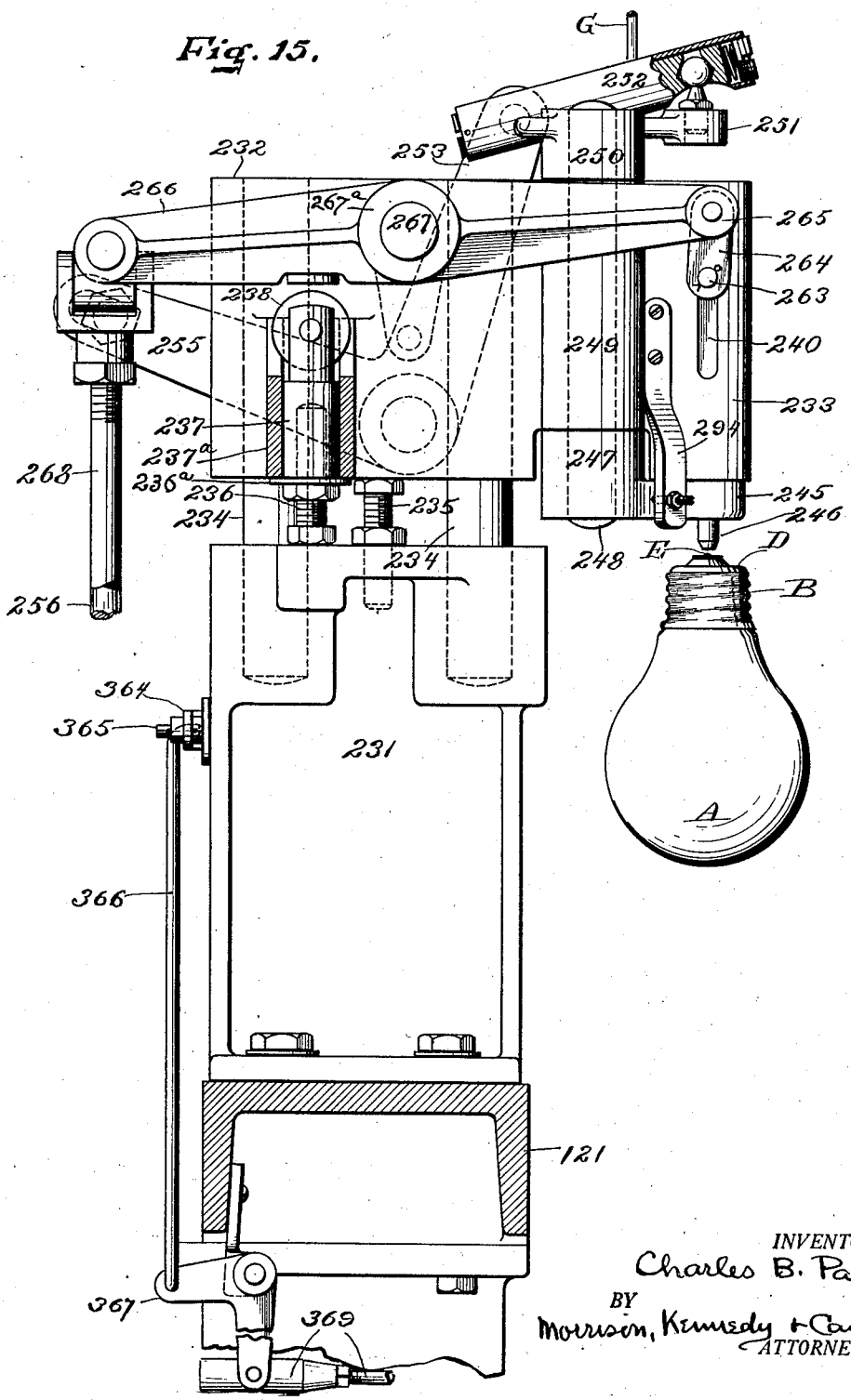
Figure 18:
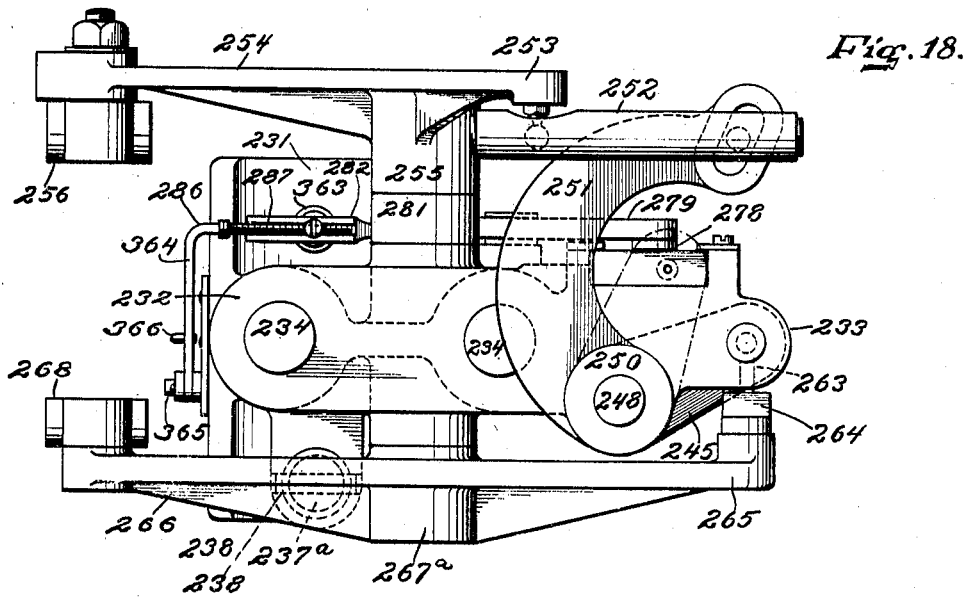
Figure 19:
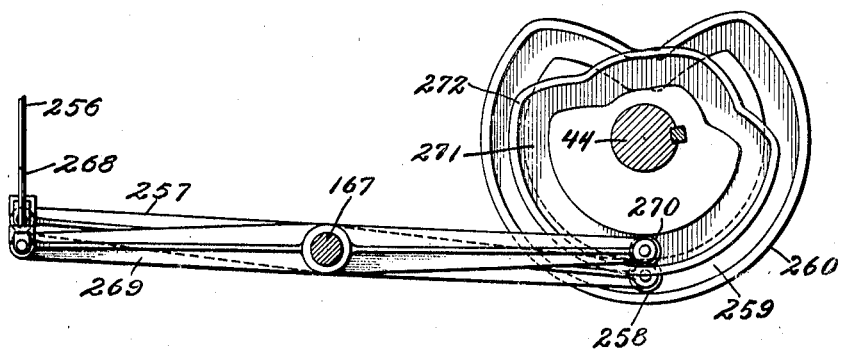

Fig. 15 is a right elevation of the end wire soldering mechanism. Fig. 16 is a left elevation thereof. Fig. 17 is a detail elevation view partly in section of the solder feeding device. Fig. 18 is a top plan view of the mechanism of Figs. 15 and 16. Fig. 19 is a right elevation of the actuating connections of the mechanism of Figs. 15 to 18.

Figure 20:
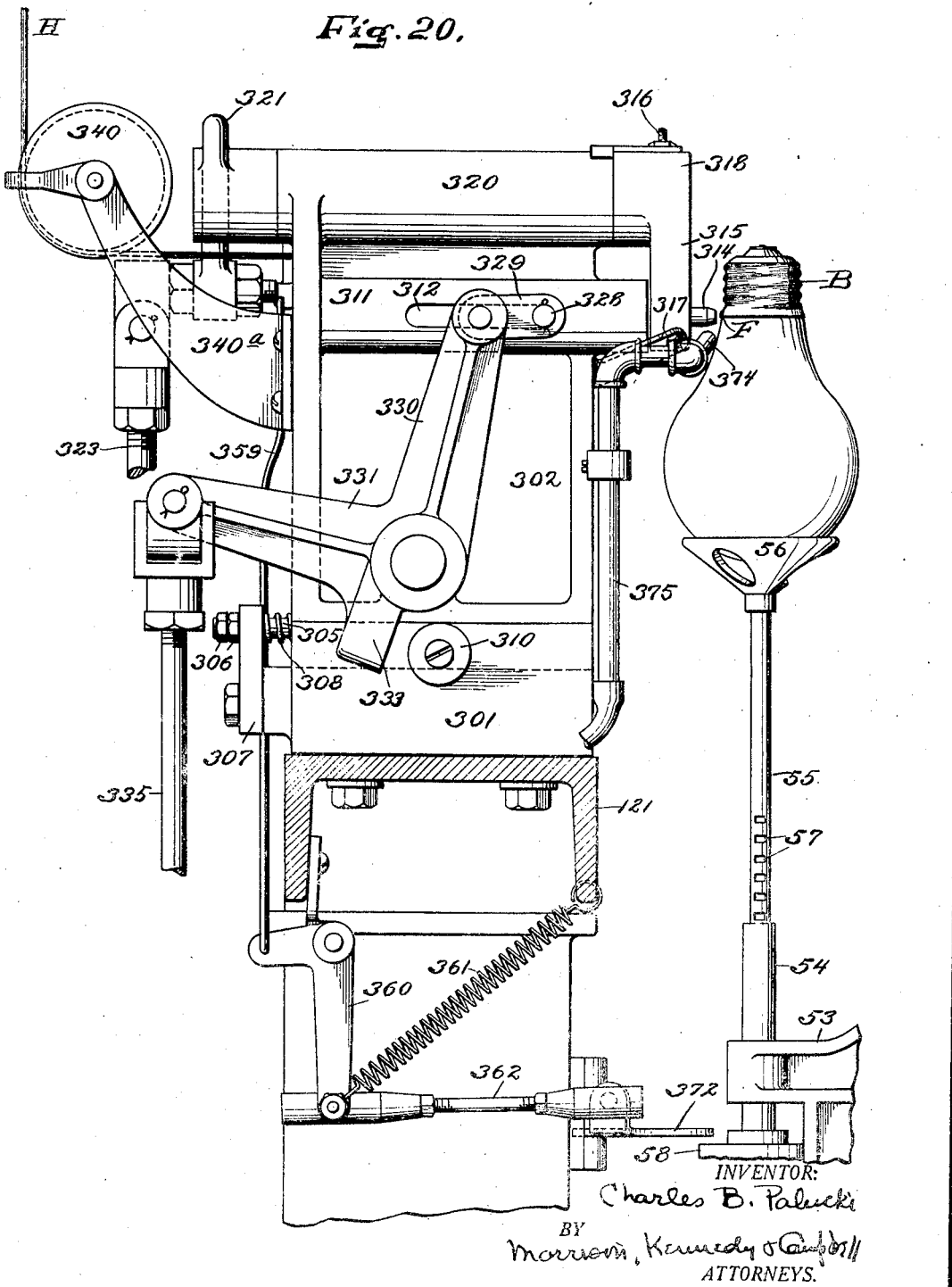
Figure 21:
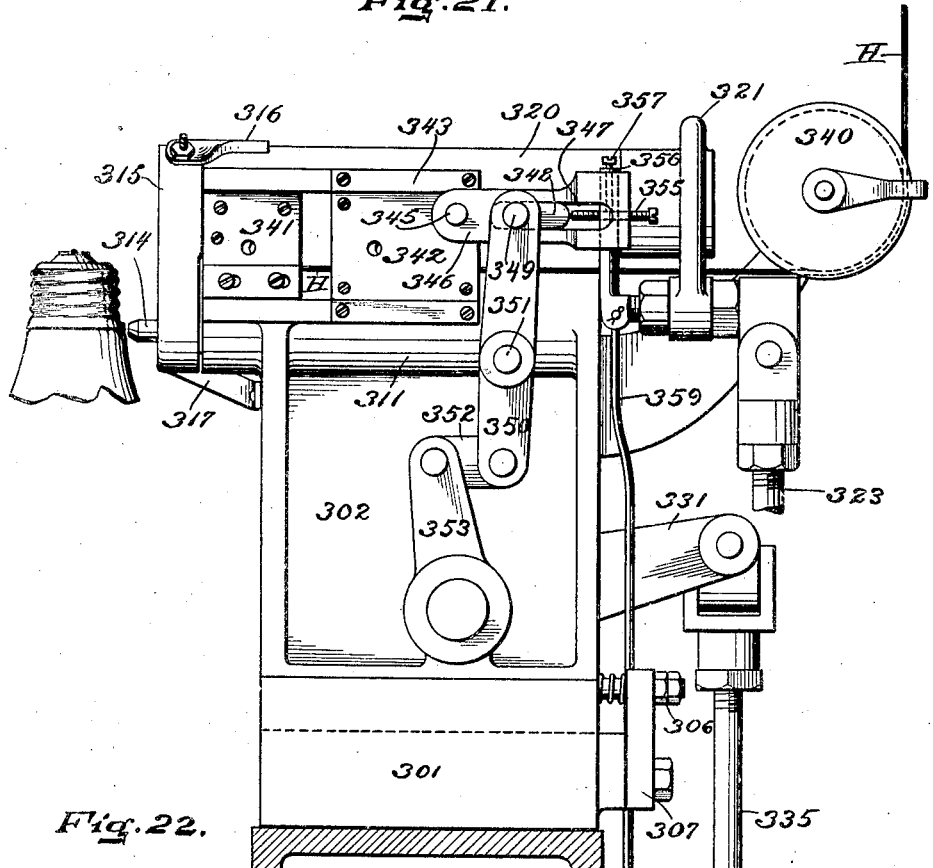
Figure 22:
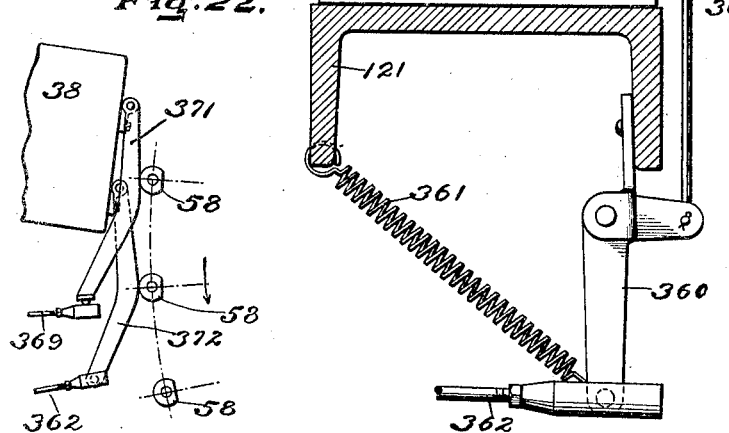
Figure 23:
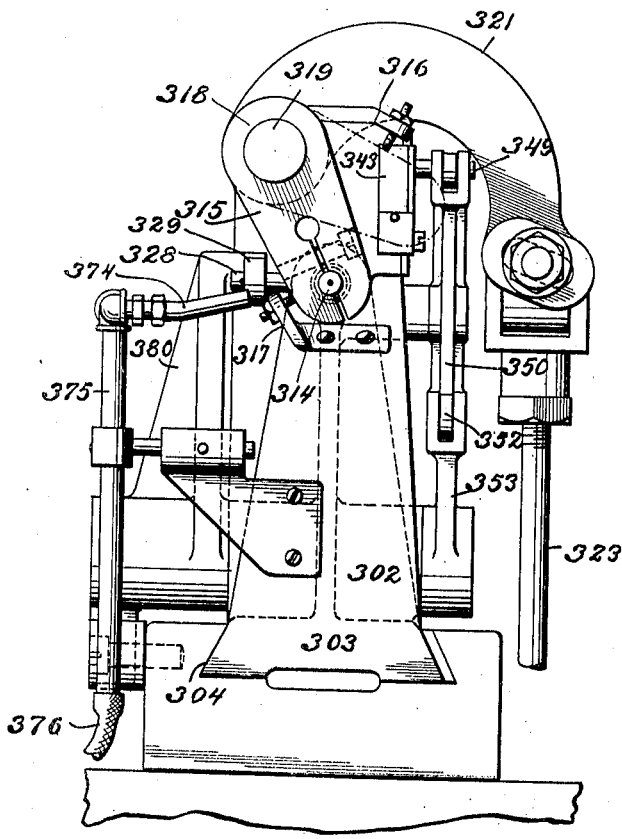
Figure 24:
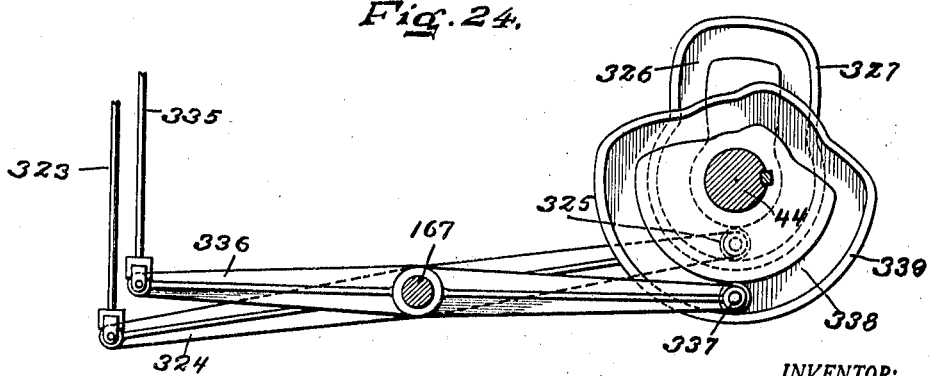

Fig. 20 is a right elevation of the side wire soldering mechanism. Fig. 21 is a left elevation thereof. Fig. 22 is a partial top plan view in diagram. Fig. 23 is a front elevation thereof. Fig. 24 is a front elevation of the actuating connections of the mechanism of Figs. 20 to 23.

The assembled lamp members are shown in Fig. 4 and subsequent figures, comprising the glass container or bulb member A, and the base member B, the latter comprising the screw threaded metallic sleeve C, lined with cementing material, not shown, and the metallic button or disk D at the end, separated from the sleeve by insulating material. Connected with the filament are the two leadwires, the end leadwire E issuing through a central perforation in the disk D, and the side leadwire F issuing between the glass bulb and the edge of the screw sleeve C. These lamp elements loosely assembled are loaded into each of the successive heads or chucks to be described, and are thereupon subjected to heating to soften the cement for the basing operation or attachment of the base to the bulb, followed by cooling, and thereafter the cutting off to the proper length of the respective leadwires and the bending or curling them into soldering position, and thereafter soldering the respective leadwires to the end disk and to the screw sleeve of the base, and thereafter flashing and inspecting the completed lamp. The solder is supplied or fed to the respective soldering positions in the form of rods or strips G and H of solder.

The general machine construction is shown in Figs. 1 and 2. The machine stands upon legs 30 at the top of which is a circular table 31 shaped with certain shoulders as shown in Fig. 2. At the high center part of the table is bolted a center plate 32 overlying the adjacent depending part of the table, to hold down the turret web to be described. Upstanding from the center plate 32 is a fixed post 33 at the top of which is secured a hub 34 from which radiate a series of fixed arms 35 constituting a spider, and at the outer ends of the arms are secured upper and lower circumferential tracks 36 and 37, fixed in position, constituting cams and operating by the travel of the heads as will be described.

Rotating on a portion of the table 31 is a turret 40 having an inwardly extending web 41 confined by the central plate 32. The turret is preferably driven intermittently and for this purpose is shown as having a series of forty-five depending studs 42, corresponding with the number of heads to be described. In each cycle of the machine the turret is advanced to the extent of one stud or 8° of angular travel. This may be accomplished by means of a flanged cam 43, operating between each pair of studs in turn, and having a prolonged dwell followed by a short incline which effects each rotary shift of the turret. The step-drive cam 43 is shown mounted on a drive shaft 44 arranged horizontally and turning in suitable bearings in the machine frame. On the same shaft 44 is shown a gear 45 driven at reduced speed by a worm 46 mounted on a power shaft 47, which may be turned for example from a motor through belts and pulleys. The fast continuous rotation of the shaft 47 causes intermittent advance of the turret so as to bring each of the forty-five heads to each station or position around the path of head travel. Each cycle, or turn of the shaft 44 may take 4 seconds, the machine thus putting 900 lamps through the complete process per hour.

For convenience certain relative terms will be used in the manner illustrated in the drawings, without intending them as limitations, as many positions or relations of parts may be changed or reversed. Thus the term front is herein used as referring to the exterior side of the orbit or path of travel of the lamp series, while the word rear indicates the opposite thereof or the interior side or central portion of the machine. In this sense Fig. 4 is a left elevation, and the right side of this figure is the front of the machine, in all positions of the lamp and the heads which carry them. So also words of direction like up and down are used relatively, and as shown the base of the lamp is at the top end of the lamp, although the same principles could be used with the series of lamps carried relatively inverted.

The head or chuck 50 is indicated in Figs. 1 and 2 and shown in more detail in Figs. 4, 5 and 6. It comprises a flange 51 by which it is attached to the turret 40. From the flange extends downwardly a bracket 52 having forwardly extending lugs or slide bearings 53, one below the other, through which slides vertically a bearing sleeve 54, within which in turn slides vertically a plunger 55 at the top of which is mounted a spring lifted cup or socket 56 adapted to receive the rounded end of the lamp bulb.

For the purposes of adjustment of the head for lamps of different length or height, the plunger 55 is shown formed with a series of notches 57, any one of which may be engaged as will be described, to determine the normal elevated position of the yielding cup 56. Attached upon the sleeve 54 is a collar 58, which is bored to form an interior way in which a toothed bolt 59 may slide, pressed by a spring 60, so that its tooth will engage one or another of the notches 57 in the plunger. The plunger and sleeve normally yield downwardly, resisted by a spring 61 confined between the collar and the lower bearing 53, and rise together by the pressure of the spring. An assembled lamp may be inserted in position by lowering the plunger, sleeve and cup manually or mechanically, to admit the lamp, and allowing them to rise until the cup presses resiliently the lamp bulb in its chucked position. The parts are shown engaging a medium size lamp. If a longer lamp is to be manufactured a readjustment may be made by lowering the plunger relatively within the sleeve, so that the normal raised position of the spring cup will be lower. This is readily done by merely rotating the plunger 55 through 90° more or less, which removes the active notch 57 from the bolt 59, and cams the bolt outwardly to bear against the cylindrical part of the plunger. It is thereupon only necessary to slide the plunger downwardly within the sleeve to the desired extent, and upon rotating it back to initial position the spring 60 will snap the bolt tooth into another of the notches, thus recoupling the plunger and sleeve in the new adjustment.

The head or chuck 50 comprises not only the depending bracket 52 but the upstanding bracket 63, and at the top of this bracket is a front flange 64 upon which is bolted the shank 65 of a ring member 66, which will be termed a basing ring or flame shield, this ring being heated by the flames and transmitting the heat to the lower part of the lamp base, wherein is contained the cement material adapted to be softened by the heat for cementing the base member to the bulb under the pressure of spring 61. The heated basing ring 66 is shown in Figs. 3, 4 and 5 and elsewhere. It is formed with a circumferential flame channel 67 between a short upper flange and a longer lower flange, and at the rear side this member has a through hole 68 admitting the flame to the rear of the channel. These parts are relatively fixed on each head, and the flame ring is sufficiently larger than, so as to surround loosely, the lamp base, facilitating insertion of the lamp into the head. Fig. 5 shows the lamp in heating position with the ring surrounding the lower part of the lamp base or sleeve, while Fig. 4 shows the lamp in position for the cooling and subsequent operations, the ring surrounding the upper part of the sleeve, the lower part thereof being exposed below the ring. When the lamp is relatively raised as in Fig. 5, the slight flange around the lower end of the metal base sleeve C may make contact with the beveled lower side of the flame ring.

The heating ring is loose around the lamp base, so loose that it is substantially spaced from the base, though naturally it may contact at one side if not concentric. It therefore protects the base from the flames and becoming red hot radiates heat to the base, thereby effecting the cement softening and attachment. Such ring permits the lamp easily to move endwise through it between its heating and subsequent positions; and the ring perfectly cooperates with the form of chuck shown, comprising members at the base and bulb ends, the lamp standing endwise between them, and there being no conflict between chuck and ring.

The lamp is held in its vertical position between the spring lifted socket or cup 56 below, and a top socket or ring 70, both mounted on and constituting the active holding or chuck members of the head. The central part of the lamp base enters the opening in the top ring 70, and the elevation of this ring determines the position of the lamp, its normal or lowered position as shown in Fig. 4 and its elevated or heating position in Fig. 5. The chuck ring 70 has a rearwardly extending shank 71 bolted to a vertically adjustable block 72. This block, to maintain the relation of the parts, has depending ears 73 sliding upon the opposite sides of the flange 64. At its rear the block 72 carries a stud or cam roll 74 by which the block may be lifted and lowered through the action of the fixed cams or tracks 36 and 37, see Figs. 2 and 5. Preferably the cam 37 operates to determine the altitude of the chuck ring, and the latter is held down by a spring, for example by the following fittings. The block 72 is mounted at the top end of a vertical rod 75 which slides through an aperture in the flame ring shank 65 and down into a bore 76 in the bracket 63. At its lower end the rod 75 has a foot or enlargement 77 upon which bears downwardly a compression spring 78, the top end of which is confined by a shouldered stop sleeve 79 inserted in the bore 76 and there confined by the shank 65. The track cam 37 is shaped to raise the block 72 and chuck ring 70, to an elevated position slightly higher than as in Fig. 5, thus to allow the lamp to rise until the base sleeve flange contacts the flame ring, the chuck ring then being lowered by the spring 78 until it rests upon the lamp base, as in Fig. 5. Preferably springs 78 and 61 substantially balance, so that friction holds the parts in either position; consequently the track cams 36 and 37 need only be provided at the points where the chuck ring is to be lowered or raised respectively, namely raised as in Fig. 5 during heating and lowered as in Fig. 4 at other times.

The operator may sit adjacent the lamp path at the far side of Fig. 1, where there is shown a shelf 85 on which may be supplied a number of loosely assembled lamps for loading into the heads or chucks as they come around to this position. For convenience, instead of depressing the chuck cup 56 manually the following pedal connections are shown. A finger 86, seen also in Fig. 2, overlies the collar 58 in loading position. The finger is mounted at the top of a rod 87 which slides through the bracket to which the shelf 85 is attached, and the lower end of the rod is connected by a link 88 to a guide arm 89, the arm being connected by a rod 90 with a pedal 91. Thereby the pedal may be depressed to pull down the cup 56, readily permitting during each cycle the insertion of an assembled lamp, the pedal being let up to lift the lamp into its held position as shown in Fig. 4. Shortly following the loading position the cam 37 will operate to cause the raising of the lamp to the Fig. 5 or heating position, and thereupon heat is applied through the ring 66 as will next be described.

A fuel supply pipe 94 is shown conveying a suitable mixture of gas and air under valve control. A curved gas-air duct 95 receives the mixture and distributes it to an extended series of burners operating upon the basing ring and lamp, for example in sixteen successive positions and during travel between such positions. From the duct 95 extend rearwardly a series of nipples 96, Figs. 1 and 3, having at their inner ends short vertical connections constituting a chamber 97 from which extend downwardly to the left a burner 98 and upwardly to the right a burner 99. The arrangement is shown in top view in Fig. 1 and in front view in Fig. 3. For example the metal basing ring 66 in Fig. 3 receives in its channel an upwardly inclined flame from the left and a downwardly inclined flame from the right, both impinging in nearly radial directions on the ring, at the bottom of its channel 67, so as to spread both toward the front and toward the rear, and through the hole 68, the flames substantially meeting in both directions around the circumference, and the ring thus being brought to and maintained in a highly heated condition throughout the described basing portion of its travel.

By radiation the heat passes from the flame ring to the lower part of the lamp base, as seen in Fig. 5, thus effectively softening the cementing material lining the base and causing the bulb and base to adhere. Beyond the last flame the cam 37 acts to lower the lamp into its normal position of Fig. 4. While the lamp is undergoing gradual cooling it is subjected to the succeeding operations including the bending and severing of both leadwires by mechanism generally indicated as 120 and shown in Figs. 7 to 14, and thereafter the soldering of the end wire by mechanism 230 shown in Figs. 15 to 19, and thereafter the soldering of the side wire by mechanism 300 shown in Figs. 20 to 24, and thereafter to the flashing and inspecting operations by means indicated generally in Fig. 1.

Following the heating and cementing positions means may be employed for progressively cooling the lamp base to thus harden the cement and consolidate the entirety. A curved air duct 103 is shown for this purpose arranged behind or to the interior of the lamp path, as seen in Figs. 1 and 2, and from this duct extend small air tubes or jets 104 directed against the exposed upper and lower parts of the lamp base. Further along the path a front or exterior air duct 105 is provided, with similar extensions or jets 106. Both ducts and all of the jets may be supplied with cooling air through a supply pipe 107.

The flashing of the successive lamps may be effected in any suitable manner. There is shown a flashing box 110 through which the lamps travel and are subjected, at different stations, to progressively varying currents, supplied by the cables 111, 112 and 113 extending from a central overhead controller or switch box 114. Near the end of the flashing box is indicated a screen 117, as of dense glass, through which each lamp, under illumination, may be inspected, for the purpose of determining defects and discarding imperfect lamps. Beyond this point the successive heads may be opened by pedal mechanism similar to that already described, and the completed lamps removed by the same or by a separate operator, or delivered for packing or other operations.

The bending and severing mechanism 120 shown in small scale on Figs. 1 and 2 operates to bend or curl the end and side leadwires E and F and cut them off short, leaving the curled ends adjacent to the end disk D and screw sleeve C respectively of the lamp base member, in the most advantageous position for the subsequent soldering. The details of the bending and severing mechanism are shown in Figs. 7 to 14. It is mounted on a curved fixed table 121 at the front of the machine as seen in Figs. 1 and 2. The mechanism is substantially a removable unit having its own base 122 seen in Figs. 1, 2, 7 and 9. Extending upwardly from the base 122 is an upright bracket 123, carrying the side bending and severing instrument 190 to be described, shown separately in Fig. 14, and an extension bracket 124 overhanging the path of the heads and lamps and carrying the top or end instrument 130 to be described, shown separately in Figs. 12 and 13.

Referring first to the top or end instrument 130, the overhanging bracket 124 is formed with an enlargement 125 constituting a vertical slideway for the instrument, and with a horizontal way 126 to accommodate a rack 155 to be described, and thereabove a vertical guide 127.

The instrument 130 for bending and severing the top or end wire E is shown as composed of several relatively movable parts, including a non-rotary mandrel 131 which takes part both in the bending or curling and the cutting of the wire, being formed with a cutting edge 132. The mandrel is formed or mounted at the lower end of an upright shank 133 having two shoulders near its lower end as appears in Fig. 12. At the top end of the mandrel shank 133 is screw-attached a collar or block 134 having a rightward extending finger or lug 135 engaging in the vertical slot of the guide plate 127, thus preventing rotation of the mandrel while permitting vertical play. A spring 136 connected to the lug 135 and to a fixed point below pulls constantly downward, tending to lower the mandrel, as the instrument comes into action, until its lowermost tip end contacts the metallic end disk D of the lamp base.

Rotatable on the mandrel part of the instrument is a complementary part 139 cooperating with the mandrel both for bending or curling the wire and severing it. Thus, rotating with the rotary member 139 is a hook 140 adapted to engage the wire and wrap it circularly around the mandrel. The rotary part 139 also is formed with a cutting edge 141 adapted to cooperate with the cutting edge 132 of the mandrel to sever or shear off the excess wire after it has been curled around the mandrel in contact with the lamp base disk.

The rotary bender or part 139 is shown constructed with a sleeve-like shank having a head 142 which may be screw threaded and provided with hexagonal sides, and below the head a collar 143 is adjustably attached by screw 144, the collar having a screw 140* for the attachment therein of the hook 140, composed for example of stiff wire. These described parts are mounted by means of the head 142 on a shank 145 shown as a sleeve surrounding the shank 133 of the mandrel. The shank 145 is adapted to slide vertically in the way 125 and to rotate therein relatively to the mandrel shank 133. For rotating the sleeve shank 145, and the bending and cutting parts, the sleeve is shown as formed with elongated gear teeth 146. For vertical shifting of the bender shank or sleeve 145 the sleeve is shown formed at its upper end with a circumferential groove 147, which groove is engaged by opposite studs 148 mounted on a fork 149 constituting the extremity of a lever arm 150 swinging vertically about a fixed pivot 151 and having a front arm 152, the actuation of which will be later described. A spring 153 pulls down on the arm 150 tending always to lower the sleeve shank 145 and the bending part. The spring 136 already mentioned tends to hold the mandrel and its shank down, with the block 134 in contact upon the sleeve shank, so that with the swing of lever 150—152 the mandrel and the bender move downwardly together, until the former is stopped by contact with the lamp base, following which the bender continues its downward movement relatively to the mandrel. This brings the bender 140 and severing edge 141 into operative relation to the mandrel and its severing edge 132.

For the rotation of the toothed sleeve shank 145 of the bending part there is shown a toothed rack 155 mounted in the horizontal way 126 on the bracket 124, the teeth of said rack engaging the teeth of the shank, the latter being elongated to permit the vertical sliding movements of the shank. The rack near its rear end has a rightward extending stud 156 passing through the slotted cover 157 of the slideway, so that the rack may be operated by right and left shifting of the stud.

Preferably these parts are operated in harmony through lever 150—152 and rack 155 by automatic connections from cams on the main shaft 44. The connections may be as follows. The stud 156 of the rack 155 is connected by a rod 160 with the upper end of a lever arm 161 pivoted on the base 122 and having an inclined arm 162, the extremity of which is connected by a short link 163 with a block 164, guided as will be described. Depending from the block 164 is a long link 165 extending to a cam lever 166 mounted on a fixed stud or fulcrum axle 167, see Fig. 8, the rear end of the lever having a follower 168 entering the cam groove 169 of a cam disk 170 mounted on the main shaft 44. By these connections the cam 44 serves to rotate the bending part.

The vertical reciprocation of the bending part may be effected through a link 173 extending from the lever arm 152 downwardly to a guide arm 174 fulcrumed on the base 122, said guide arm having pivoted to it a block 175 from which extends downwardly a long link 176 connecting at its lower end to a cam lever 177 similar to the lever 166, already described. The lever 177 is fulcrumed on the axle 167 and its rear end carries a follower 178 entering the cam groove 179 of a cam disk 180 on the main shaft. The cams 169 and 179 are cooperatively timed so that the leadwire E is curled about the mandrel, severed and left snugly against the button or disk D.

Referring next to the side wire bending and severing instrument 190, the upstanding bracket 123 is formed with an enlargement or nearly horizontal slideway 184 for the instrument 190, and with a nearly vertical rack slideway 185, the latter having a removable cover 186 and frontwardly thereof a nearly horizontal guide 187. The instrument 190 is shown in detail in Figs. 11 and 14 and its construction and operation are largely analogous to the end instrument 130. It comprises a non-rotatable mandrel 191 which in this case is formed with a longitudinal groove 192 to receive the leadwire F. The mandrel serves not only for curling the wire around it but it contains a cutting edge 193 for severing the wire. The outwardly extending shank 194 has attached to its extremity a block 195 analogous to the block 134 and a portion of which is guided in the guide 187, thus preventing rotation while permitting longitudinal shifting of the mandrel, a spring 196 pulling rearward on the block tending to force the mandrel into contact against the lower edge of the lamp base sleeve C.

The side instrument 190 comprises also a rotary part 199 surrounding the mandrel and to which is adjustably attached a collar 200 carrying a bending or curling hook 201 which may be composed of stiff wire adapted to engage the leadwire and carry it around the mandrel. The bending part also has a cutting edge 202 cooperating with the cutting edge 193 of the mandrel for severing the bent leadwire. The bending part 199 may have a threaded head 203 connected to a sleeve shank 204, which may be analogous to the sleeve shank 145, and having elongated gear teeth 205 and at its front end a stud receiving groove 206.

For effecting the rotary movements of the mandrel 191 and its sleeve shank, the teeth of the latter are shown engaged by a toothed rack 208 confined in the slideway 185. Near the lower end of this rack it is provided with an outstanding stud 209 on which is mounted the block 164 before referred to, through which the cam 170 causes the reciprocation of the rack of the first instrument. By this arrangement the cam connections effect simultaneously the actuation of both of the racks and therefore the rotation of the bending parts of both the end and side instruments.

The sliding of the bending member 199 and its sleeve shank 204 toward and from the lamp base may be effected by a lever arm 211 rigid with the lever arm 174 and extending upwardly from the fulcrum thereof, its upper end formed with a yoke 212 having studs 213 extending into the groove 206 at the front end of the shank. When the lever 174, 211 is oscillated from the cam 180 this causes the sleeve shank 204 to move rearwardly and frontwardly, as governed by the timing of the cam, simultaneously with the corresponding movements of the sleeve shank of the first instrument. A spring 214 is shown pulling rearwardly on the lever 211 tending to move the bender rearward toward the lamp base. The spring 196 causes the mandrel member to partake of these movements of the bending member until the mandrel contacts the lamp base, and thereafter the bending member may move further relatively to the mandrel, coming into bending and severing relation thereto. The cam timing, as with instrument 130, causes the side leadwire to be curled, severed and laid snugly against the slight flange at the end of the lamp sleeve C, ready for soldering.

Figs. 9 and 10 show a bracket 219 at the left side of bracket 124 and pivoted thereon a swinging arm or rod 220, one end of which is accessible as seen in Fig. 1, and the other end of which carries a hook 221. The arm may be swung by hand to such position, as shown, wherein it will be held by its mountings, that the arm and hook will gather in the leadwire E if too far out of place, and bring it within reach of the stiff wire hook 140 by which it is bent or curled around the mandrel 131. In the case of each leadwire the rotary curling action effects a twisting of the wire and this and the scraping and severing serve to clean the wire surface adequately for soldering. Beyond mechanism 120 is shown a pressure wheel 224 on an arm 225 swingable on a bracket 226 on the table 121; the wheel being spring pressed against each lamp base sleeve as it travels by, to press snugly to the sleeve the bent and severed side leadwire.

The novel features of the leadwire bending and severing mechanism herein disclosed are not made the subject of claim herein, but are claimed in copending application Serial No. 65,568, filed February 25, 1936.

The end or top wire soldering mechanism 230 is shown in Figs. 1 and 15 to 19. On the same curved table 121 that carries the bending and severing mechanism is mounted the base 231 of the soldering mechanism. Above the base is a supporting block or carriage 232, the rounded front end 233 of which is directly above the position of the lamp in each traveling head. The carriage 232 may be set at an adjustable height above the bed, to control accurately the relation of the soldering devices to the lamp and to the top leadwire E which is to be soldered to the lamp base disk D and it may have a slight lifting and lowering movement in each cycle; for which purposes the carriage is shown slidable upon a pair of fixed vertical posts 234 upstanding from the base. On top of the base is shown a threaded stop bolt 235 on which the lowered carriage rests and which has a lock nut for securing the desired height adjustment.

The top carriage 232, normally supported on bolt 235, should be lifted slightly in each cycle to assure clearance above the advancing lamp and then lowered for the soldering operation. For this purpose there is shown an inverted bolt 236 attached beneath a slidable plunger 237 by means of a locknut, with an extended stop washer 236a between, to prevent plunger 237 from lifting too high, and the head of bolt 236 rests on the base 231. The plunger slides in a vertical way 237a formed in a boss extending rightwardly from the carriage, and at its top end carries a contact roll 238 adapted to be contacted by the under side of a rock lever arm 266 to be described. The lever is fulcrumed at 267 on the carriage and when it is lowered by rod 268 the couple lifts the carriage, later lowering it for the purposes described.

The rounded end 233 of the carriage is formed with a vertical bore 239 best shown in Fig. 16, in which travels vertically a plunger 240 below which depends a driver or bar 241, the lower end of which operates through a guide plug 242 secured by a set screw 243 in the lower end of the bore. The actuation of the plunger 240 will be described, its downward movement causing the driver bar to descend through the guide plug and a solder carrier 245 thereby to eject a portion of solder downwardly into soldering position within the curled extremity of the leadwire.

The rocking solder carrier 245 is adapted to swing between the solder ejecting or delivering position shown in full lines in Figs. 15, 16 and 18 and the solder receiving position shown in dotted lines in Fig. 18. The swinging extremity of the carrier supports a guide piece 246 in the nature of a nozzle, the lower end of which is immediately above the place to be soldered, and is lifted as already described to clear the lamp coming into position. The carrier 245 is shown mounted at the lower end of a vertical rock shaft 248 turning in a fixed bearing 249 constituting a part of the carriage 232. At its top end, above its bearing, the shaft 248 carries a collar or hub 250 from which extends leftwardly a curved arm 251 by which the shaft and carrier may be rocked. This arm is shown connected by a universal link 252 with an upwardly extending arm 253 of a bell crank lever, having also a frontwardly extending arm 254 and fulcrumed on a fixed axle 255. For rocking the bell crank and thereby the carrier there is shown a link 256 extending downwardly from the extremity of the arm 254. As shown in Fig. 19, on a smaller scale, the lower end of the link 256 is connected to a cam lever 257 fulcrumed on the axle 167 and having at its rear end a follower or roller 258 traveling in the cam groove 259 of a cam disk 260 mouned on the main shaft 44. By this arrangement the contour of the cam 259 causes the solder carrier to shift between receiving and delivering positions in proper timing with the other motions to be described.

The plunger 240 may be moved downwardly and upwardly for the operation of the solder driving bar 241 as follows. Extending rightwardly from the plunger is a pin 263 and this is connected by a curved link 264 with the front end of an arm 265 of a lever which has also a rear arm 266 and the hub 267ª of which is attached to a fulcrum shaft 267 extending through the carriage 232. The rear end of the lever arm 266 is connected by a downwardly extending link 268 with a cam lever 269, shown in Fig. 19, said lever having a follower or roll 270 engaging in the groove 271 of a cam disk 272 on the main shaft 44. In each downward stroke the ejector 241 drives through the carrier 245 the short length of solder wire G contained therein and thrusts it loosely upon the curled leadwire resting at the top side of the lamp disk D.

The intermittent downward feeding of the solder wire G in each cycle to place a portion thereof within the channel or nozzle of the carrier 245 may be as follows, it being understood that the swinging movement of the carrier from receiving position effects the shearing off of the fed length of solder, such length being held in the carrier until driven downwardly therefrom by the driver 241. The solder feeding devices are shown in Figs. 16 and 17. A first or lower fixed gripper 274 is shown through which the solder strip passes and thereabove is shown a second such gripper 275 through which the strip passes on the way to the fixed gripper. Each gripper may be of the well known type comprising a tapered recess carrying a roller element pressed wedgingly into the recess and against the strip. Therefore it is only necessary to reciprocate slightly the movable gripper 275 to effect intermittent feed of the strip, the other gripper preventing back feed in the return motion. These grippers are mounted between vertical guide bars 276 at the left face of the carriage 232.

The solder feed gripper reciprocation may be effected through a pin 277 outstanding from the gripper 275, this pin being connected by a depending link 278 with a bell crank lever 279 fulcrumed adjacently on the carriage. The upstanding arm of the bell crank may be oscillated horizontally to an adjustable extent from a depending arm 280 on a hub 281 on the same rock shaft 267 that carries the lever 266. The connection between the rock arm and the bell crank is shown as a special link 282 operating with adjustable lost motion to vary the extent of solder feed. Thus the link 282 is formed with a slot 283 in which extends a pin 284 projecting from the rock arm 280. In the slot 283 behind the pin 284 is a plug 285 attached to the pin to move longitudinally with it. The slot length is adjustable to determine the lost motion or play of the pin and plug in the slot. It will be understood that there is sufficient friction in the gripper 275 to prevent accidental movement thereof; therefore the shorter the lost motion or play of the plug in the slot the longer will be the feed motion of the gripper 275, and vice versa. The adjustment of this lost motion or play is effected by a longitudinal stop screw 286 extending rearwardly through the rear end of the link 282, and into the slot to contact the reciprocating plug. By turning the screw one way or the other, therefore, the extent of solder feed can readily be adjusted.

It is desirable to prevent the feed of solder at certain times, namely when a lamp is missing from one of the traveling heads of the turret, and the following connections are shown to secure this result. The adjusting screw 286, which determines the effective length of the slot 283 and thereby the extent of lost motion or play between the link 282 and plug 285 is not threaded directly into the link 282, the link having an open groove 287 as shown in Fig. 18, within which the adjusting screw 286 may move upwardly out of the path of the plug 285, and return downwardly into operative position; so that by raising bodily the set screw above the illustrated position the plug is unconfined and will oscillate idly in the link slot, rendering inoperative the feed. This adjustment of the screw 286 is shown as effected by threading that screw through a cylindrical plunger 288 adapted to slide vertically through a bore in the link and having a shoulder near its lower end limiting its relative downward movement. In the upper end of the plunger 288 is a set screw 289 by which the desired adjustment of screw 286 may be fixed. The plunger 288 is extended downwardly as a rod 290 and the rod and plunger are normally held down by a spring 291 compressed between the link 282 and a pin 292 on the rod. The rod is thus yielding, and when lifted renders the solder feed inoperative, as described. The automatic control of this mechanism by the presence or the absence of a lamp will be described subsequently in connection with the corresponding devices of the side wire soldering mechanism.

The solder carrier or arm 245 in its swinging movements between solder receiving and solder ejecting or applying positions may be limited by a pair of stops, namely a stop 293 near the receiving position and a stop 294 near applying position, each stop having a set screw for accurately determining the limit of movement, to adjust the carrier accurately to the feeding and ejecting devices respectively.

When each portion of solder is dropped or ejected into soldering position on the button or disk D of the lamp, a soldering flame is to be applied to melt the solder, which thereupon flows into the recess at the center of the disk D and embeds the curled extremity of the leadwire E. For this purpose a burner or jet 296 is shown directed at the soldering point and mounted swingably at the top end of a pipe section 297 adjustably slidable in a clamp 298 on the base 231, there being shown a flexible pipe 299 extending thereto from a convenient source 376 of gas-air mixture, supplied for example from the supply pipes 377 and 378.

The side soldering mechanism 300 for the severed and bent leadwire F is shown in Figs. 1 and 20 to 24. On the same curved table 121 that carries the bending and severing mechanism 120 and the end soldering mechanism 230 is mounted the base 301 of the side soldering mechanism. Above the base is a supporting block or carriage 302 arranged to slide horizontally frontwardly and rearwardly to a small extent by reason of a dovetail 303 at the foot of the carriage engaging in a slideway 304 in the base. As seen in Figs. 20 and 21 the carriage has a rearwardly projecting stop bolt 305 on which are adjustable lock nuts 306 cooperating with a stop plate 307 through which the bolt extends, the stop plate mounted on the base 301, thereby forming a stop for the frontward movement of the carriage, the bolt being surrounded by a spring 308 pressing the carriage frontwardly to its stopped position, at which the solder delivering nozzle 314 is in operative relation to the lamp and leadwire. At times the carriage is caused to shift rearwardly to a slight extent to afford safe clearance for the advance of each lamp into soldering position, whereupon the carriage returns forwardly until the solder nozzle substantially contacts the lamp sleeve B and leadwire F. To effect such retracting movement of the carriage there is shown mounted on the base a roller 310, Fig. 20, cooperating with a lever arm or lug 333 to be later described.

In general the solder feeding, applying and heating means for the side leadwire are similar to those for the end leadwire, but stand at right angles thereto. Thus on Fig. 20 is shown a horizontal enlargement 311 of the carriage 302, this enlargement being bored to receive a plunger 312 carrying a driver bar by which a portion of the solder may be ejected through the nozzle 314. The solder delivering tube or nozzle 314 is shown mounted on a rocking carrier 315 movable between an upper or solder receiving position, shown in dotted lines in Fig. 23, where the carrier contacts against a stop 316, and a lower or delivering position shown in full lines in Figs. 20, 21 and 23, at which the carrier contacts a lower stop 317; both being screw adjustable. The hub 318 of the swinging carrier 315 is attached to a horizontal shaft 319 which takes its bearings in an enlargement 320 at the top of the carriage. The carrier is at the front end of this shaft and at the rear end the shaft carries a curved rock arm 321 by which the shaft and carrier may be rocked.

The actuating connections for the solder carrier 315 may comprise a link 323 extending downwardly from the free end of the rock arm 321, the lower end of said link being connected as seen in Fig. 24 to a cam lever 324 fulcrumed on the axle 167 and having at its rear end a follower 325 engaging the groove 326 of a cam or disk 327.

The reciprocating plunger 312 by which the solder is driven through the carrier nozzle may be connected and operated as follows. The plunger carries a pin 328 extending leftward through a slot in the carriage portion 311, and said pin is connected by a link 329 with the upper end of a lever arm 330 which has also a rearwardly extending arm 331, these constituting a bell crank attached to a shaft 332. This lever also has a downwardly extending arm or lug 333 adapted to engage the roller 310 on the fixed base when the lever is swung, a couple thus being formed so that after the lost motion between the lug and roll is taken up the further swinging of the lever causes the rearward sliding of the carriage against the spring 308 to retract the solder nozzle for clearance with the advancing lamp.

The operating connections for the lever 330—331 and connected parts comprise a link 335 extending downwardly from the lever, the lower end of the link connected to a cam lever 336, Fig. 24, pivoted on axle 167 and having at its rear end a roll or follower 337 engaging the groove 338 of a cam 339. Thus the two cams 327 and 339, both secured on the main shaft 44, and making one turn per cycle, effect cooperative movements of the carriage, the solder carrier, and the solder ejector, and as will next be described the solder strip feeder.

The solder strip H for the side soldering is shown passing around a guide wheel 340 mounted on a rear bracket 340ᵃ on the carriage 302 and thence passes horizontally through the solder feeding mechanism which is analogous to that of the end soldering mechanism as shown in Figs. 16 and 17. Thus a fixed grip device 341 is shown adjacent the point where the solder passes frontwardly to the carrier 315, and to the rear thereof is the reciprocating grip device 342 mounted in a guide box or slideway 343, so that the reciprocation of the grip 342 will cause the solder strip to advance or feed frontwardly to the extent of such reciprocation, adjustable as will be described to determine the amount of solder delivered for the side leadwire of each lamp. As seen in Figs. 21 and 23 the reciprocable grip 342 has a rightwardly extending pin 345 which is engaged with a special link 346 having a longitudinal slot 347 and a vertical groove like that of link 282 in Figs. 16 and 18. In the slot 347 is engaged a plug 348 attached to a pin 349 projecting rightwardly and engaged by the top end of a rock lever 350 fulcrumed at 351 to the carriage portion 311, so that the rocking of lever 350 reciprocates the plug 348 and thereby the link and grip. The lever 350 is shown connected by a short link 352 with a rock arm 353 extending upwardly from the fulcrum shaft 332 of the lever 330—331, so that the movements effected by the cam 339 are communicated also to the solder feeding gripper.

The slotted link 346 carries a contact screw 355 which may be adjusted to determine the lost motion or play of the plug 348 in the slot 347, and thus determine the extent of reciprocation of the feed grip in each cycle. The contact screw is not mounted directly in the link 346 but is mounted in a plunger 356 which is slidable vertically in the link, the link being grooved to permit vertical shifting of the screw therein. The plunger at its top end carries a set screw 357 for fixing the contact screw 355 in its adjustment. By this arrangement the elevation of the plunger 356 in the link 346 operates to remove the contact screw from the path of the plug, and thus prevent feed of solder, for example in the absence of a lamp.

These described devices for rendering inoperative the solder feed when a lamp is missing may be connected as follows. Extending downwardly from the plunger 356 is a rod 359, the lower end of which is attached to the rear arm of a bell crank 360, the downward arm of which is pulled frontwardly by a spring 361, this spring therefore tending to lower the plunger 356 and maintain the contact screw 355 in its operative position. To lift these parts in the absence of a lamp there is shown a link 362 extending to the devices by which the presence or absence of a lamp is detected, for the described control.

This detecting and controlling principle for the side solder feed is applied also to the end solder feed, and by referring back to Fig. 16 there will be seen a tappet or lifting device 363 below the rod 290, the tappet being mounted at the right end of a swinging lever 364, so that the lifting of the lever will lift the rod and thus render the feed inoperative. The lever 364 is fulcrumed at 365 as seen also in Figs. 15 and 18, and the lever is swung by means of a depending connecting rod 366, the lower end of which connects with the rear arm of a bell crank 367. The depending arm of the bell crank is shown connected to a horizontal link 369 by which the control action is transmitted, this link corresponding with the link 362 of the side soldering mechanism.

Referring now to Fig. 22, the link 369 is shown extending to a detector lever 371 fulcrumed to a front bracket 38, shown also on Fig. 2, being one of the brackets by which the table 121 is supported. The lever 371 is so positioned and shaped as to cooperate with one of the vertically adjustable elements of each of the traveling heads, in this case the hollow collar 58 seen also in Figs. 2, 4 and 6. Similarly the link 362 of the side soldering mechanism is connected with and operated by a detector lever 372 also fulcrumed to the bracket 38 and shaped to cooperate with the vertically adjustable element 58 of each of the lamp carrying heads. As the end soldering mechanism precedes the side soldering mechanism in the advance of each head and lamp, so each controlling element 58 acts first on the detector lever 371 of the end soldering mechanism and in the next cycle on the detector 372 of the side mechanism. The detector levers or feelers are in the nature of cams and are so shaped and timed that each control element 58, when a lamp is missing, may operate upon the levers successively in a manner to lift successively the contact screws 286 and 355 at the right point of time to prevent a retracting stroke of the link 282 or 346, so that there will be no advancing stroke of the feed grip 275 or 342, and no solder will be fed to the head or chuck from which the lamp is missing.

Such lamp detecting control will be readily understood from Figs. 2, 20 and 21, considering that when a lamp is present in the head, as in Fig. 20, the bearing sleeve 54 is lowered and therefore the collar or control element 58 is lowered out of reach of the detector levers, whereas when a lamp is missing as in Fig. 2 the element or part 58 will be lifted to its highest position by the spring 61 and will then stand at the proper level to afford detecting cooperation with the levers 371 and 372 as shown in Fig. 22.

For the side soldering mechanism, Figs. 20 and 23 show a soldering burner 374 mounted at the top end of an adjustable gas pipe 375 connected by a flexible tube 376 with a source of gas.

There has thus been described a lamp making machine adapted for the finishing operations in manufacturing electric lamps of the kind composed of bulb and base portions, which machine embodies the principles and attains the objects of the present invention; since however many matters of method, operation, combination, mechanism and construction may be variously modified without departing from the principles of the invention, it is not intended to limit the invention to such matters except to the extent set forth in the appended claims.

I claim:

1. In a machine for manufacturing electric lamps of the kind composed of bulb and base portions, with interposed cement to secure them together, and a leadwire extending from the edge of the base, the combination of a traveling conveyor, and a series of lamp-carrying heads thereon, each head having a lamp-holding chuck comprising underneath and overhead sockets arranged to leave the lamp base exposed and a heating ring loosely surrounding the base of the held lamp and having upper and lower flanges and extending substantially around the lamp base to radiate to the base for softening such cement, and means for heating said ring comprising a system of burners directed between such ring flanges.

2. A machine as in claim 1 and wherein the burner system comprises burners operating in pairs directed without intersection to the opposite sides of each ring to heat the entire circumference thereof.

3. Lamp finishing machine with traveling heads each having a chuck for holding the loosely assembled lamp base and bulb, with cement material between base and bulb, within its lower part, and means for heating the base to unite it to the bulb before bending and severing the leadwires and soldering them to the base; characterized by the provision in each head of a heating ring independent of said chuck and loosely surrounding and protecting the base and radiating heat to its cemented portion, and a system of burners applying flames to the ring of each of the several heads, while so surrounding and protecting the lamp base.

4. Lamp finishing machine with traveling heads each having a chuck for holding the loosely assembled lamp base and bulb, the lamp base having cement material within its lower part, and means for heating the base to unite it to the bulb before bending and severing the leadwires and soldering them to the base; characterized by the provision in each head of a heating ring loosely surrounding and protecting the base and radiating heat to its cemented portion, and a system of burners applying flames to the rings; each heating ring being outwardly flanged, and the flames being disposed in slanting pairs, crossing but not intersecting, whereby each ring is maintained hot around both sides.

5. In a machine for manufacturing electric lamps of the kind composed of bulb and base portions, with interposed cement to secure them together, and a leadwire extending from the edge of the base, the combination of a traveling conveyor, and a series of lamp-carrying heads thereon, each head having a lamp-holding chuck arranged to hold the lamp while leaving its base exposed, and a heating ring independent of said chuck and loosely surrounding and protecting the lower part of the base of the held lamp, said ring adapted to be heated and to radiate to the base for softening such cement; and means for causing a relative shift between the chuck and heating ring after the heating, whereby to expose the edge of the lamp base and thereby render it accessible for applying or attaching the leadwire thereto.

6. In a machine for manufacturing electric lamps of the kind composed of bulb and base portions, with interposed cement to secure them together, and a leadwire extending from the edge of the base, the combination of a traveling conveyor, and a series of lamp-carrying heads thereon, each head having a lamp-holding chuck arranged to leave the lamp base exposed, and a heating ring loosely surrounding the lower part of the base of the held lamp and adapted to be heated and to radiate to the base for softening such cement, and means for causing a relative shift between the chuck and heating ring after the heating, whereby to expose the edge of the lamp base and thereby render it accessible for applying or attaching the leadwire thereto; the chuck being vertically shiftable between an elevated heating position wherein the lamp base edge is surrounded by the heating ring and a lowered position wherein the lamp base edge is exposed for access to the base and leadwire.

7. A machine as in claim 6 and wherein the shifting means comprises a track cam holding the lamp in heating position for an extended length of travel and then lowering it to attaching position.

8. Lamp finishing machine with traveling heads each having a chuck for holding the loosely assembled lamp base and bulb, with cement material between base and bulb, and means for heating the base to unite it to the bulb before bending and severing the leadwires and soldering them to the base; characterized by the provision in each head of a heating ring independent of said chuck and loosely surrounding the base and radiating heat to its cemented portion, and a system of burners applying flames to the rings; the lamp chuck and heating ring in each head being relatively shiftable so that after the heating period the lamp base lower part may be exposed to permit the side leadwire to be bent, severed or soldered, and means to shift the same.

9. A machine as in claim 8 and wherein is a fixed cam acting by the travel of each head to cause the change of relation of ring to lamp between the heating and subsequent operations.

10. Machine of claim 8 and wherein in each head the heating ring is relatively stationary while the chuck and lamp are adjustable upwardly for the heating, and downwardly thereafter, with a spring holding the chuck in one position and cam means to shift it to the other position.

11. In a machine for manufacturing electric lamps of the kind composed of bulb and base portions, with interposed cement to secure them together, and a leadwire extending from the edge of the base, the combination of a traveling conveyor, and a series of lamp-carrying heads thereon, each head having a lamp-holding chuck comprising chuck members at the base and bulb ends between which the lamp stands endwise thereby to leave the lamp base exposed, and a heating ring located between said chuck members and loosely surrounding the lower part of the base of the held lamp and adapted to be heated and to radiate to the base for softening such cement, and means for causing a relative shift between the chuck and the heating ring after the heating, whereby to expose the edge of the lamp base and thereby render it accessible for operating upon the leadwire.

CHARLES B. PALUCKI.